United States Patent [19]
Vercellotti et al.

[11] Patent Number: 5,266,925
[45] Date of Patent: Nov. 30, 1993

[54] ELECTRONIC IDENTIFICATION TAG INTERROGATION METHOD

[75] Inventors: Leonard C. Vercellotti, Oakmont; John C. Schlotterer, Murrysville, both of Pa.

[73] Assignee: Westinghouse Electric Corp., Pittsburgh, Pa.

[21] Appl. No.: 769,986

[22] Filed: Sep. 30, 1991

[51] Int. Cl.$^5$ ............................................. G08B 13/14
[52] U.S. Cl. ................................... 340/572; 340/502; 340/505
[58] Field of Search ........... 340/572, 505, 502, 825.54, 340/825.08

[56] References Cited
U.S. PATENT DOCUMENTS 4,471,345  9/1989  Barrett, Jr. ......................... 340/572
4,924,210  5/1990  Matsui et al. ...................... 340/572

*Primary Examiner*—John K. Peng
*Assistant Examiner*—Thomas J. Mullen, Jr.
*Attorney, Agent, or Firm*—D. Schron

[57] ABSTRACT

An electronic identification tag interrogation method is provided in which a portal transmits an interrogation signal which is received by an electronic identification tag within its field of range. The interrogation signal includes an address which requests a response from every tag having an address greater than or equal to the address of the signal. If more than one reply is received by the portal, the interrogation address is bisected and the interrogation signal is retransmitted. The interrogation address is successively bisected until a single response is isolated. When a single response is isolated, communication is directed between the portal and the identification tag and the interrogation system is reset to isolate and identify any remaining tags.

15 Claims, 2 Drawing Sheets

ELECTRONIC IDENTIFICATION TAG INTERROGATION METHOD

BACKGROUND OF THE INVENTION

1. Field of the Invention

This invention relates to an electronic identification tag interrogation system method in which an electronic tag is attached to a person or object for identification purposes. The present method resolves the problem of collisions between replies from various electronic identification tags received by a sensing portal.

2. Description of the Prior Art

Electronic identification tag systems are known for tracking personnel and property. The electronic identification tags track personnel and property as they enter and exit a monitored area through various portals. Such electronic identification tags are also used to detect unauthorized access by personnel through portals to secured areas.

The tracking of personnel and property is accomplished by monitoring the location of an electronic identification tag attached to the personnel or property. Interrogation means provided at the portals to a confined area monitor the ingress and egress of personnel and property through each portal. By monitoring the ingress and egress of personnel and property through various portals, the location of the personnel or property in a much larger facility can be determined.

In order to track the personnel or property, a transmitter provided at a portal sends an interrogation message which is received by the electronic identification tags affixed to personnel or property within the search field of the portal. Usually, the search field of a portal is directed to a confined area controlled by the portal. A transmitter provided in the electronic identification tag responds to the interrogation message by sending a reply message. Frequently, the interrogation message from a portal includes a portal identifier which instructs the electronic identification tag to reply with a similar portal identifier included in the reply message. The portal identifier instructs only the proper portal to process the reply, thereby eliminating processing of a reply message by an unintended portal which is within the transmission range of the electronic identification tag. Thus, if two portals receive a reply signal from an electronic identification tag, the reply message includes means for determining which portal should process the reply message.

Where the number of personnel or packages being tracked is large, the possibility exists that a number of reply messages from the electronic identification tags affixed to the personnel or packages will collide when received by the portal. To minimize problems caused by colliding reply signals, prior art interrogation systems provide a time variant delay in the electronic identification tag responses. This time variant delay is at least pseudo-random to provide diversification of responses and minimize collisions of the reply messages.

The prior art time variant delay diversification scheme is proposed for the situation in which two tags are in the field of an interrogating portal and reply at exactly the same time. This is usually not a problem for access portals where a tag is used to unlock a gate or activate an escapement to allow entrance to an area. The tag in this case is activated by a portal field that is limited in range of activation. Otherwise, a tag in back of the first can open the lock by a process known as "tailgating". Physical means are needed to limit the "tailgating" to guarantee that consecutive tags are not mistaken for each other. This is accomplished by shaping the interrogating field of influence at a portal. In such an instance, a time variant delay diversification scheme to prevent collisions of reply messages may not be necessary.

A different type of portal reading device is necessary for loading parcels or bags, such as of mail, onto trucks. In this case, a portal reading device located at the top of the truck opening records the loading or unloading of parcels. The portal reading device consists of two interrogation heads which indicate that the parcel has been moved from an area just outside the truck opening onto the truck bed. The use of two interrogation heads provides the ability to determine that the parcel or bag was actually loaded onto the truck bed. Because of the proximity of the two interrogation heads, there is a possibility that the fields of the separate heads may overlap. To overcome this problem, the overlap area may be fashioned to become a region of ineffective communication and, therefore, a dead zone. A microprocessor receives input from the interrogation heads and monitors whether the parcels have been loaded onto the truck beds. During interrogation, the replies from the electronic identification tags may collide. Diversification of the replies is necessary to prevent the continuation of the collisions.

As stated previously, the prior art employs a time delay system to achieve diversification of replies. A problem arises with such a diversification scheme when a large volume of parcels may possibly be expected to be present within the field of the interrogation heads. In order to accommodate a large volume of parcels, an equal number of diverse time delays must be provided. Consequently, every time an interrogation signal is transmitted, the monitoring system must wait for every possible time delayed response to arrive before retransmitting an interrogation signal. If the interrogation system is provided with 100 time delays, the transmitter must wait for all 100 diverse time-delayed responses to be sent before retransmitting an interrogation signal. The system must wait for reception of all possible time-delayed response signals regardless of the actual volume of parcels present in the interrogation field. In other words, when time delay diversification is used, the interrogation system must wait for the possibility of every conceivable reply regardless of whether or not a parcel is present to provide such a reply. Consequently, there is a need for an interrogation system which eliminates the frequently unnecessary wait for the last conceivable time delayed reply.

SUMMARY OF THE INVENTION

An electronic identification tag interrogation system is provided in which a portal is provided with transmitter means for providing an RF interrogation signal and receiving means for responding to an RF tag signal having identifying data encoded therein. At least one electronic identification tag is provided having supply means for providing electrical power to the tag. The tag is also provided with an address and with memory means for storing identifying data associated with the tag. The tag includes both an RF receiver means powered by the supply means for processing an interrogation signal and RF transmitter means for transmitting identifying data stored in the memory means in response to the receipt by the RF receiver means of an interrogation signal having a request encoded therein. The electronic identification tag is also provided with means for suppressing the RF transmitter means in response to a signal requesting the tag to suppress further responses.

In operation, the portal transmits an interrogation signal requesting a response from all electronic identification tags having an address field greater than a given value usually "0 state". If no responses are received, the interrogation is complete. If only one response is received, the portal can address that electronic identification tag directly. If more than one response is received by the portal, the interrogation system will employ a series of address field bisection steps in order to isolate a single response. When such a single response is received, the portal communicates directly with the isolated electronic identification tag and then transmits a signal to the identification tag to suppress any further responses. The interrogation system is then reset to continue interrogation until each identification tag is isolated and acknowledged.

DESCRIPTION OF THE PREFERRED EMBODIMENTS

The present invention uses a diversification scheme that assigns a different tag identification number to each of the electronic identification tags 28 that are expected to reply to an interrogation. The interrogator 26 sends a request for all tags 28 to look at their identification numbers, and, if the tag identification number is greater than the requested address from the interrogator 26, the tag replies. Under conditions of tag 28 collisions, the interrogator 26 conducts a direct search on tag identification numbers using bisection until a single tag 28 responds. The interrogator 26 acknowledges each of the replies which are not garbled, transmits a suppression signal to the identified tag 28 and sends the next interrogation message.

Figure 1:
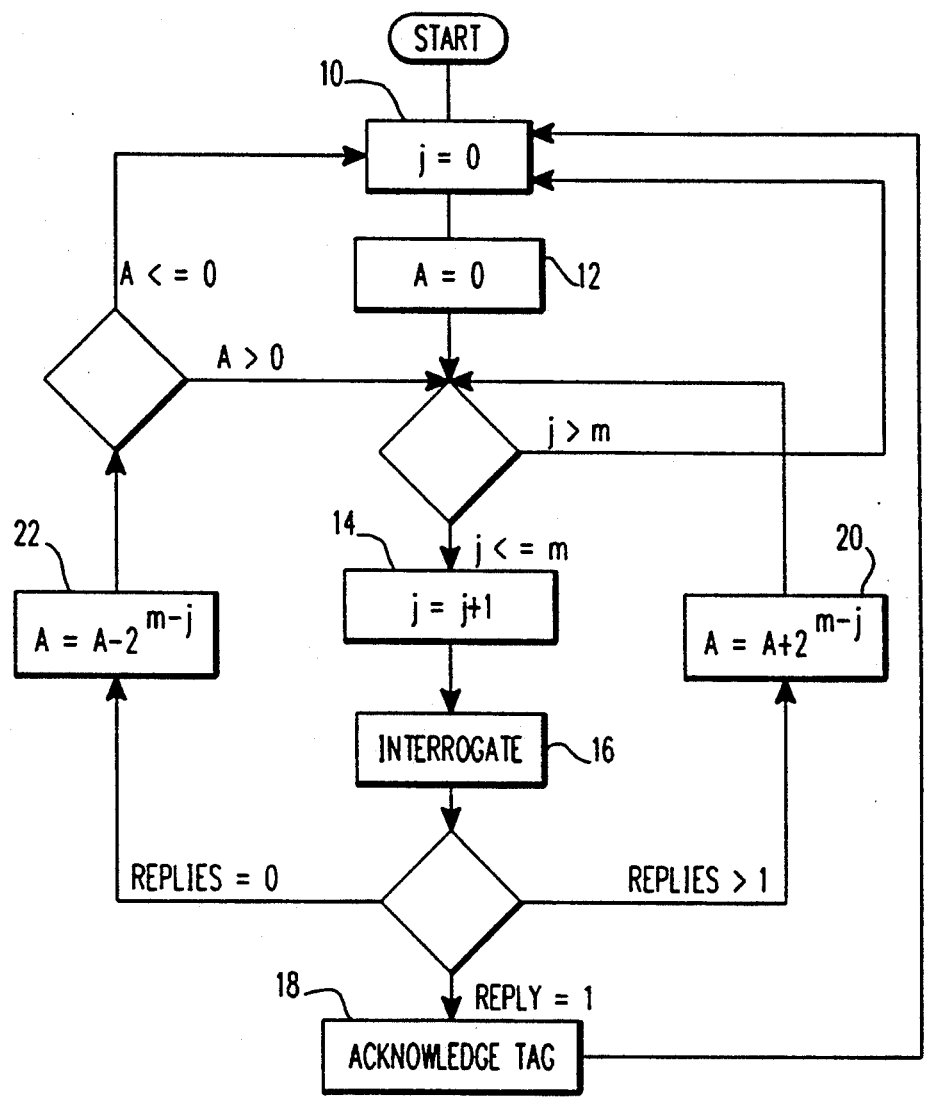
FIG. 1 is a block diagram of a presently preferred embodiment of the electronic identification tag interrogation system of the present invention.

The interrogation method can be best understood with reference to FIGS. 1 through 4. The block diagram of FIG. 1 represents a direct search interrogation method for a tag identification range from 1 to $2^m$-1 tags 28. Each tag 28 is encoded with a different identification number. A tag 28 is instructed to reply to an interrogation signal if the tag identification number is greater than or equal to A (the interrogation address).

When the direct search interrogation method starts, index j is set at 0 in step 10. The interrogation address A is also set at 0 in step 12. Provided index j is less than or equal to m, the index j is incremented one unit in step 14 and the interrogation is conducted in step 16.

Figure 2:
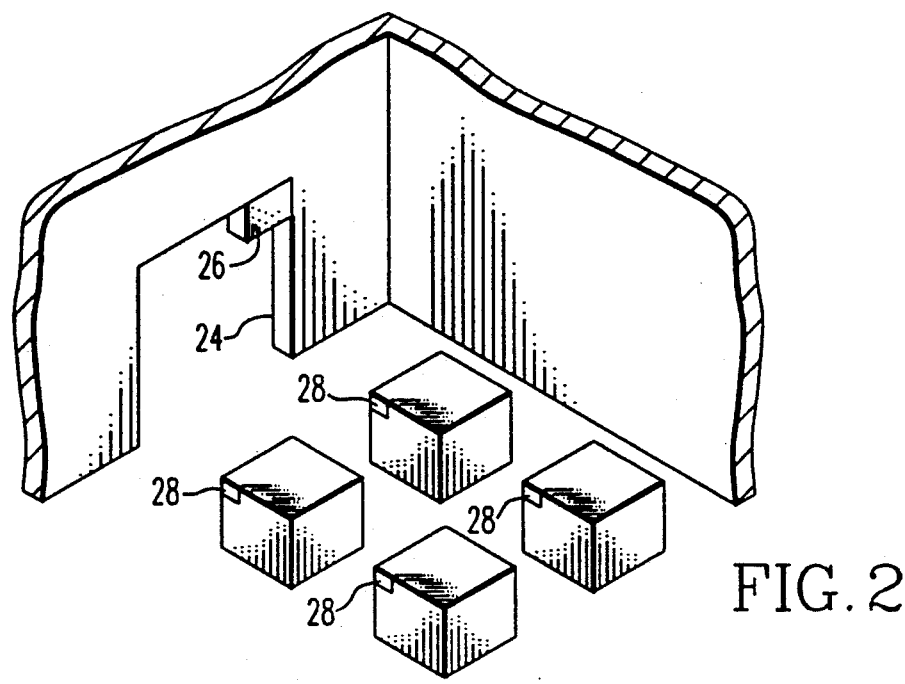
FIG. 2 is a schematic representation of the tag interrogation system of the present invention in which tags 28 provided on packages are addressed by interrogator 26 provided in portal 24.
Figure 3:
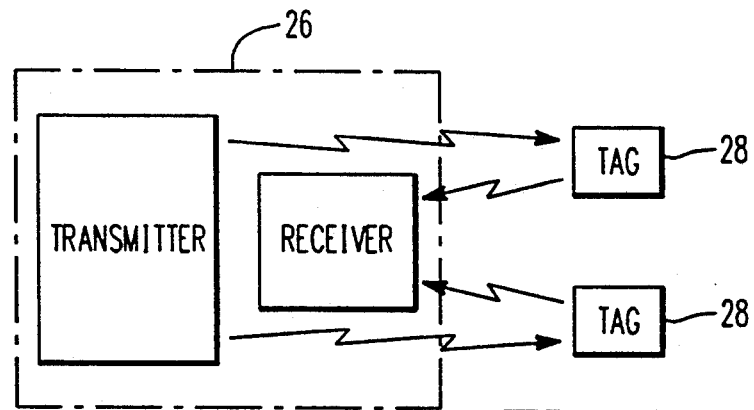
FIG. 3 is a schematic representation of tags 28 receiving a signal from the transmitter of interrogator 26 and responding with a signal received by the receiver of interrogator 26.
Figure 4:
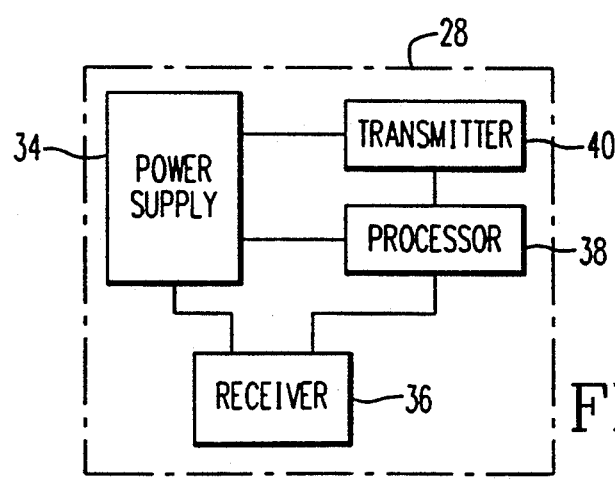
FIG. 4 is a schematic representation of tag 28 showing power supply 34 which provides the power to operate receiver 36, processor 38 and transmitter 40.

FIG. 2 shows the tag interrogation system of the present invention in which tags 28 provided on packages are addressed by interrogator 26 provided in portal 24. Figure shows tags 28 receiving a signal from the transmitter of interrogator 26 and responding with a signal received by the receiver of interrogator 26. FIG. 4 shows tag 28 having power supply 34 which provides the power to operate receiver 36, processor 38 and transmitter 40.

If the portal interrogator 26 receives only one reply, the responding tag 28 is acknowledged in step 18 and the direct search interrogation method is reset to the start, step 10. Once an identification tag 28 is acknowledged, the portal interrogator 26 instructs that tag 28 not to respond to further interrogations from the same portal number. This reply suppression will be reset by the portal 24 after all identification tags 28 are acknowledged.

If the portal interrogation receives more than one reply, the interrogation address is incremented by $2^{(m-j)}$, in step 20. Provided index j is less than or equal to m, the index j is again incremented by 1 in step 14 and the interrogation signal is retransmitted in step 16. In the event that index j is greater than m, the direct search interrogation method is reset to start, step 10. This bisection process is continued until the portal interrogation receives only a single reply.

If, after an interrogation, the portal interrogator 26 does not receive any replies, the interrogation address A is changed from A to A-$2^{(m-j)}$ in step 22. If A is less than or equal to 0, the direct search interrogation method is returned to the start, in step 10. If the interrogation address A is greater than 0, the index j is incremented by 1 in step 14 and interrogation is again conducted in step 16 provided index j is less than or equal to m.

For 32 bit-tag identification numbers, the bisection process may require as many as 33 separate interrogations per tag 28. However, the number of interrogations may be decreased by providing additional diversity to the direct search system. Additional diversity may be achieved by permitting more than one tag 28 to respond per interrogation for any given address number by means of discrete time slots. The time slots can be picked from the least significant bits of the tag identification number. For example, 8 discrete time slots can be obtained by allocating three bits of the tag identification number to provide the time delayed responses. By using the additional diversity of three bits, the search field is reduced from 32 bits to 29 bits. With this additional diversity, a maximum of 30 interrogations are needed to resolve a conflict of two tags 28 responding in exactly the same time slot.

In a typical interrogation system, the interrogation message is sent at 9600 baud and requires 43 bits of information. This message takes approximately 5 milliseconds to transmit. Each electronic identification tag replies with 63 bits of information at 100 kbaud, taking less than 700 microseconds. The 8 time-delayed replies thus take approximately 5 milliseconds. Since the interrogation signal and reply signal are sent at vastly different frequencies in the low RF and UHF bands respectively, full-duplex operation can be obtained. The replies can keep up, therefore, with the interrogations, although processing time may provide another limitation. For electronic identification tags 28 responding in exactly the same time slot, the direct search is imposed until uniquely one reply is obtained. For two electronic identification tags 28 replying in the same time slot, thirty interrogations (150 milliseconds) may be required in the worst case to find both tags 28. The acknowledgements from the interrogator 26 are directed messages and require an additional 5 milliseconds for each acknowledgement, giving a worst case total of 155 milliseconds for the interrogation.

It is expected that a large number of tags 28 may suddenly appear at a portal 24 at any given time. Assuming that the tag addresses are established to interfere with the above scheme in the worst possible situation, an absolute worst case time to interrogate and sort the tags 28 can be determined. The worst-case time to interrogate and sort N tags 28 is given by the equation [(N−1)(150 ms)+5 ms]. For a 100 tag pile, this absolute worst-case time to interrogate and sort the 100 tags 28 is 14.9 seconds. On the average, this worst-case time will be one-eighth the length because of the eight-fold time-slot diversity made possible by the hybrid direct search and time diversity scheme. Additionally, another factor of 2 can be claimed for where the tag numbers are in the range of $2^{32}$, which is the range of the tag numbers. In addition, modifications may be made to the search algorithm to achieve additional reductions. Such additional time reductions may arise because it is not always necessary to return to the beginning of the search each time a unique tag 28 is identified.

The tag reply message should be kept portal-specific for ungarbled messages in order to eliminate the possibility of reception of the reply message by more than one portal 24. For garbled messages where tag replies from more than one portal 24 are involved, the direct search method resolves the conflict. Because the tag identification numbers are distinct, the search algorithm at each portal 24 still sorts between the repliers by discrete interrogations. In such a manner, a portal-specific reply for an ungarbled message is received.

In a preferred embodiment of the invention, the reply suppression of an identification tag 28 is accompanied by a shift in the power consumption level of the identification tag 28 to a lower power mode. In this lower power mode, which conserves the battery power supplying the identification tag 28, the identification tag 28 does not listen to instructions or other communications transmitted by a portal 24. Instead, the identification tag 28 periodically energizes for the limited purpose of detecting a loss of carrier. A loss of carrier may occur when either the identification tag 28 is removed from the field of a portal interrogator 26 or when the portal interrogator is turned off. Once the identification tag 28 detects a loss of carrier, it will continue to periodically energize for the limited purpose of detecting the presence of a carrier. If a carrier is detected, the identification tag 28 is turned on and will listen for communications from the portal interrogator 26.

In this preferred power saving embodiment, the identification tag 28 consumes less power because the decoder circuitry is turned off during the entire lower power mode. In addition, the periodic operation of the identification tag receiver 28 also serves to conserve power. However, if power consumption is not a concern, the receiver and decoder circuitry of the identification tag may be maintained in an active mode at all times. In this case, the portal interrogator 26 can manually send instructions to the identification tag 28 to disable and re enable the acknowledgement replies of the identification tag 28.

In the foregoing specification certain preferred practices and embodiments of this invention have been set out, however, it will be understood that the invention may be otherwise embodied within the scope of the following claims.

We claim:

1. An electronic identification tag interrogation system comprising:
   (a) at least one portal having transmitter means for providing an RF signal and receiver means for responding to an RF tag signal having identifying data encoded therein;
   (b) at least one electronic identification tag having supply means for providing electrical power to said tag, memory means for storing identifying data associated with said tag, RF receiver means powered by said supply means for processing an RF signal, and RF transmitter means for transmitting identifying data stored in said memory means in response to the receipt by said RF receiver means of an RF signal having a request encoded therein, said at least one electronic identification tag provided with a discrete identification number;
   (c) interrogation means for searching said identification number of said at least one electronic identification tag, said interrogation means comprising
      i. means provided in said at least one portal for transmitting a first interrogation signal to said at least one electronic identification tag, said first interrogation signal having a request encoded therein seeking a response from each of said at least one electronic identification tags having an identification number within a first desired address range;
      ii. means provided in said at least one electronic identification tag for processing said first interrogation signal and responding to said first interrogation signal if the identification number of said at least one electronic identification tag is within said desired address range;
      iii. means for selecting a second desired address range when more than one response to said first interrogation signal is received from said at least one electronic identification tag; and
      iv. means for transmitting a second interrogation signal, said second interrogation signal having a request encoded therein seeking a response from each of said at least one electronic identification tags having an identification number within said second desired address range.

2. The electronic identification system of claim 1 further comprising means provided on said at least one portal for acknowledging receipt of a single response from said at least one electronic identification tag and means for suppressing further replies from said acknowledged electronic identification tag in response to further interrogation signals.

3. The electronic identification system of claim 2 wherein said means for suppressing further replies comprises means for shifting said electronic identification tag to a lower power consumption mode in which said means for processing said first interrogation signal is turned off.

4. The electronic identification system of claim 3 further comprising means for enabling replies from said acknowledged electronic identification tag in response to further interrogation signals.

5. The electronic identification system of claim 4 wherein said means for enabling replies further comprises means for periodically detecting whether an interrogation signal is present.

6. The electronic identification system of claim 5 wherein said RF receiving means and said means for processing said first interrogation signal are turned on when said means for periodically detecting whether an interrogation signal is present initially detects an absence of an interrogation signal and thereafter detects the present of an interrogation signal.

7. The electronic identification system of claim 1 wherein said at least one electronic identification tag is provided with means to delay responding to an interrogation signal.

8. The electronic identification system of claim 7 wherein said means to delay comprises three bits of said tag identification number wherein said at least one electronic identification tag responds in one of eight predetermined time slots.

9. An electronic identification tag interrogation system comprising:
 (a) at least one portal having transmitter means for providing an RF signal and receiver means for responding to an RF tag signal having identifying data encoded therein;
 (b) at least one electronic identification tag having supply means for providing electrical power to said tag, memory means for storing identifying data associated with said tag, RF receiver means powered by said supply means for processing an RF signal, and RF transmitter means for transmitting identifying data stored in said memory means in response to the receipt by said RF receiver means of an RF signal having a request encoded therein, said at least one electronic identification tag provided with a discrete identification number;
 (c) interrogation means for searching said identification number of said at least one electronic identification tag;
 (d) means provided on said at least one portal for acknowledging receipt of a single response from said at least one electronic identification tag; and
 (e) means for suppressing further replies from said acknowledged electronic identification tag in response to further interrogation signals, wherein said means for suppressing further replies comprises a signal transmitted by said portal and received by said electronic identification tag instructing said electronic identification tag not to response to further interrogation signals.

10. The electronic identification system of claim 9 further comprising means for enabling replies from said acknowledged electronic identification tag in response to further interrogation signals.

11. The electronic identification system of claim 10 wherein said means for enabling replies further comprises a signal transmitted by said portal and received by said electronic identification tag instructing said electronic identification tag to respond to further interrogation signals.

12. An electronic identification tag interrogation method comprising the steps of:
 providing at least two electronic identification tags with a discrete identification number;
 transmitting a request from a portal for all said at least two identification tags having an identification number within a desired address range to respond;
 continuously bisecting said desired address range until only one of said at least two identification tags responds to said request; and
 acknowledging said one of said at least two identification tags.

13. The method of claim 12 wherein said acknowledged tag is instructed to suppress responding to further interrogation requests until all remaining said at least two electronic identification tags are acknowledged.

14. An electronic identification tag interrogation method comprising the steps of:
 providing at least two electronic identification tags with discrete identification numbers;
 transmitting a request from a portal for all said at least two identification tags having an identification number within a desired address range to respond;
 continuously bisecting said desired address range until only one of said at least two identification tags responds to said request;
 acknowledging said one of said at least two identification tags;
 instructing said acknowledged tag to suppress responding to further interrogation requests until all remaining said at least two electronic identification tags are acknowledged; and
 shifting said acknowledged tag to a lower power mode in which it periodically detects whether an interrogation signal is present.

15. The method of claim 14 wherein said acknowledged tag having detected the presence of an interrogation signal is re-enabled to respond to further interrogation requests.

* * * * *

EX PARTE REEXAMINATION CERTIFICATE (10353rd)

United States Patent
Vercellotti et al.

(10) Number: US 5,266,925 C1
(45) Certificate Issued: Oct. 23, 2014

(54) ELECTRONIC IDENTIFICATION TAG INTERROGATION METHOD

(75) Inventors: Leonard C. Vercellotti, Oakmont, PA (US); John C. Schlotterer, Murrysville, PA (US)

(73) Assignee: Round Rock Research, LLC, Mt. Kisco, NY (US)

Reexamination Request:
No. 90/011,900, Sep. 30, 2011

Reexamination Certificate for:
Patent No.: 5,266,925
Issued: Nov. 30, 1993
Appl. No.: 07/769,986
Filed: Sep. 30, 1991

(51) Int. Cl.
*G08B 13/14* (2006.01)
*G07C 9/00* (2006.01)
*G06K 7/00* (2006.01)

(52) U.S. Cl.
USPC .......... 340/572; 340/502; 340/505; 340/10.2; 340/10.32

(58) Field of Classification Search
None
See application file for complete search history.

(56) References Cited

To view the complete listing of prior art documents cited during the proceeding for Reexamination Control Number 90/011,900, please refer to the USPTO's public Patent Application Information Retrieval (PAIR) system under the Display References tab.

*Primary Examiner* — Karin M Reichle

(57) ABSTRACT

An electronic identification tag interrogation method is provided in which a portal transmits an interrogation signal which is received by an electronic identification tag within its field of range. The interrogation signal includes an address which requests a response from every tag having an address greater than or equal to the address of the signal. If more than one reply is received by the portal, the interrogation address is bisected and the interrogation signal is retransmitted. The interrogation address is successively bisected until a single response is isolated. When a single response is isolated, communication is directed between the portal and the identification tag and the interrogation system is reset to isolate and identify any remaining tags.

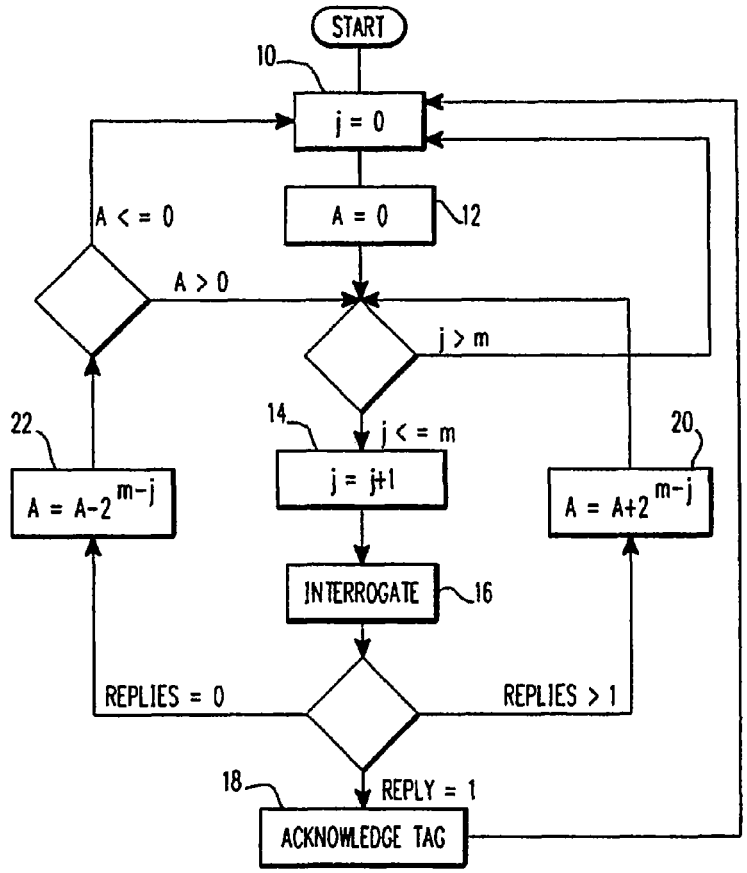

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 9 and 14 is confirmed.

Claims 1 and 12 are cancelled.

Claims 2-8, 10-11, 13 and 15 were not reexamined.

* * * * *